UNITED STATES PATENT OFFICE.

EDUARD SALOMON ALI COHEN, OF THE HAGUE, NETHERLANDS.

ELASTIC MASS AND MANUFACTURE OF THE SAME.

1,280,129.     Specification of Letters Patent.     Patented Oct. 1, 1918.

No Drawing.     Application filed April 14, 1917. Serial No. 162,149.

*To all whom it may concern:*

Be it known that I, EDUARD SALOMON ALI COHEN, subject of the Queen of the Netherlands, residing at The Hague, Kingdom of the Netherlands, have invented certain new and useful Improvements in Elastic Mass and Manufacture of the Same, of which the following is a specification.

This invention relates to an elastic mass, which may be used for many purposes; for example as a rubber substitute, as an insulating material for leadless high tension electric wires and cables, etc.

In the usual processes for the manufacture of rubber-substitutes, such as factice, and of filling materials used in the rubber industry, usually sulfur containing products are obtained, the addition of which to rubber interferes with the final vulcanization. Such products also have the drawback of becoming wholly or partly liquid at the high temperatures necessary for the vulcanization and therefore they can only be vulcanized in hermetically sealed apparatus and further they cannot be used in the production of a great many articles.

An object of the invention is to provide a new elastic mass, which is free from sulfur and may be used as a rubber substitute.

A further object is to obtain vulcanized products from said mass, which may be used as substitutes for vulcanized rubber.

According to the invention an oxidized drying oil is heated with a salt of a higher fatty acid, which term is used in the sense of alipathic acid, and in particular of a higher acid of that class, for example, stearic or palmitic acid. By this process an elastic mass is obtained which is free from sulfur. This mass may be vulcanized like rubber with sulfur or sulfur compounds and is not even partly liquid at the highest temperatures used in vulcanization.

In carrying the invention into effect, a metallic compound of one of the higher fatty acids, for example, aluminium stearate, iron palmitate, calcium or magnesium stearate or palmitate dissolved or not in a high-boiling hydrocarbon, such as ozocerite, is combined with a drying oil, such as linseed oil, which is heated to a temperature of, for example 250° C. and which has been heated during a considerable time at about the same temperature and has been treated with a known oxidizing agent, such as manganese peroxid. By this addition a tough elastic mass is obtained which may be mixed with pulverulent minerals or other substances which may be usel as filling materials in the rubber and cable industry, such as magnesia, kieselguhr, chalk, red lead (minium) oxid of zinc, asphaltum, etc., or also sulfur, and after addition of sulfur or sulfur-containing compounds may be vulcanized like rubber with the aid of pressure and heat.

*Example I.*

One part of aluminium stearate is dissolved in the same or a smaller quantity of ozocerite, paraffin wax or the like. This solution in cold (solid) or heated (molten) condition is combined with from four to ten times its quantity of oxidized linseed oil at a temperature of about 200–250° C. The oxidized linseed oil may be obtained in known manner, for example, by heating linseed oil during a considerable period with manganese peroxid or similar oxidizing agent.

*Example II.*

One part of aluminium stearate is directly dissolved in four parts of oxidized linseed oil at 200–250° C., energetic stirring being necessary in order that a homogeneous mass may be obtained.

According to each example, an elastic mass is obtained which may be used as a substitute for rubber, wholly or partly, in a large number of articles, and which, after the addition of sulfur or certain sulfur compounds, may be vulcanized like rubber. In a non-vulcanized or in a slightly vulcanized state the mass as such or after mixing with appropriate substances such as, for instance, asphaltum, is very suitable for use as insulating material for electrical purposes, especially for high tension lines. In the vulcanized state, with or without admixture with rubber, it may be used for nearly all purposes for which rubber is used now.

What I claim is:

1. The herein-described process of producing a composition of matter, consisting in heating an oxidized drying oil to a temperature of 200–250° C., and then combining it with a metal salt of a higher fatty acid.

2. The herein-described process of producing a composition of matter, consisting in heating oxidized linseed oil to a temperature of 200–250° C., and then combining it with an aluminium salt of a higher fatty acid.

3. The herein-described process of producing a composition of matter, consisting in heating oxidized linseed oil to a temperature of 200-250° C., and then combining it with aluminium stearate.

4. The herein-described process of producing a composition of matter, consisting in heating an oxidized drying oil to a temperature of 200-250° C., and then combining it with a solution of a salt of a high fatty acid in a mineral hydrocarbon of high boiling point.

5. The herein-described process of producing a composition of matter, consisting in heating oxidized linseed oil to a temperature of 200-250° C., and then combining it with a solution of an aluminium salt of a higher fatty acid in a mineral hydrocarbon of high boiling point.

6. The herein-described process of producing a composition of matter consisting in heating oxidized linseed oil to a temperature of 200-250° C., and then combining it with a solution of aluminium stearate in a mineral hydrocarbon of high boiling point.

7. The herein-described process of producing a composition of matter, consisting in oxidizing linseed oil at 200-250° C., and at that temperature combining it with a solution of aluminium stearate in a mineral hydrocarbon of high boiling point.

8. The herein-described process of producing a composition of matter, consisting in oxidizing from four to ten parts by weight of linseed oil for a considerable period at 200-250° C., and at that temperature combining it with one part of a solution of about equal parts of aluminium stearate and ozocerite.

9. The herein-described process of producing a composition of matter, consisting in heating an oxidized drying oil to a temperature of 200-250° C., combining it with a metal salt of a higher fatty acid, and adding an inert filler.

10. The herein-described process of producing a composition of matter consisting in heating oxidized linseed oil to a temperature of 200-250° C., combining it with aluminium stearate, and adding an inert filler.

11. The herein-described process of producing a composition of matter consisting in heating an oxidized drying oil to a temperature of 200-250° C., combining it with a solution of a salt of a higher fatty acid in a mineral hydrocarbon of high boiling point, and adding an inert filler.

12. The herein-described process of producing a composition of matter, consisting in heating oxidized linseed oil to a temperature of 200-250° C., combining it with a solution of an aluminium salt of a higher fatty acid in a mineral hydrocarbon of high boiling point, and adding an inert filler.

13. The herein-described process of producing a composition of matter, consisting in heating oxidized linseed oil to a temperature of 200-250° C., combining it with a solution of aluminium stearate in a mineral hydrocarbon of high boiling point, and adding a bituminous filler.

14. The herein-described process of producing a composition of matter, consisting in heating an oxidized drying oil to a temperature of 200-250° C., combining it with a metal salt of a higher fatty acid, mixing a vulcanizing agent therewith, and vulcanizing the mixture.

15. The herein-described process of producing a composition of matter, consisting in heating an oxidized linseed oil to a temperature of 200-250° C., combining it with aluminium stearate, mixing a vulcanizing agent therewith, and vulcanizing the mixture.

16. The herein-described process of producing a composition of matter, consisting in heating oxidized linseed oil to a temperature of 200-250° C., combining it with a solution of an aluminium salt of a higher fatty acid in a mineral hydrocarbon of high boiling point, mixing a vulcanizing agent therewith, and vulcanizing the mixture.

17. The herein-described process of producing a composition of matter, consisting in heating an oxidized drying oil to a temperature of 200-250° C., combining it with a metal salt of a higher fatty acid, adding an inert filler, mixing a vulcanizing agent therewith, and vulcanizing the mixture.

18. The herein-described process of producing a composition of matter, consisting in heating oxidized linseed oil to a temperature of 200-250° C., combining it with aluminium stearate, adding an inert filler, mixing sulfur therewith, and vulcanizing the mixture.

19. The herein-described process of producing a composition of matter, consisting in heating oxidized linseed oil to a temperature of 200-250° C., combining it with a solution of aluminium stearate in a mineral hydrocarbon of high boiling point, adding a bituminous filler, mixing sulfur therewith, and vulcanizing the mixture.

20. The herein-described composition of matter, comprising a drying oil which has been oxidized at a temperature of 200-250° C., and a metal salt of a higher fatty acid.

21. The herein-described composition of matter, comprising linseed oil which has been oxidized at a temperature of 200-250° C., and aluminium stearate.

22. The herein-described composition of matter, comprising a drying oil which has been oxidized at a temperature of 200-250°

C., a metal salt of a higher fatty acid, and a mineral hydrocarbon of high boiling point.

23. The herein described composition of matter, comprising 8–20 parts by weight of linseed oil which has been oxidized at 200–250° C., about one part of ozocerite, and about one part of aluminium stearate.

24. The herein-described composition of matter, comprising a drying oil which has been oxidized at a temperature of 200–250° C., a metal salt of a higher fatty acid, and an inert filler.

25. The herein-described composition of matter, comprising linseed oil which has been oxidized at a temperature of 200–250° C., aluminium stearate, and an inert filler.

26. The herein-described composition of matter, comprising linseed oil which has been oxidized at 200–250° an aluminium salt of a higher fatty acid, a mineral hydrocarbon of high boiling point and an inert filler.

27. The herein-described composition of matter, comprising linseed oil which has been oxidized at 200–250° C., aluminium stearate, a mineral hydrocarbon of high boiling point, and a bituminous filler.

28. The herein-described vulcanized composition of matter, comprising a drying oil which has been oxidized at 200–250° C., a salt of a higher fatty acid, and a vulcanizing agent.

29. The herein-described vulcanized composition of matter, comprising oxidized linseed oil which has been oxidized at 200–250° C., an aluminium salt of a higher fatty acid, and sulfur.

30. The herein-described vulcanized composition of matter, comprising linseed oil which has been oxidized at a temperature of 200–250° C., an aluminium salt of a higher fatty acid, a mineral hydrocarbon of high boiling point, and sulfur.

31. The herein-described vulcanized composition of matter, comprising a drying oil which has been oxidized at a temperature of 200–250° C., a metal salt of a higher fatty acid, an inert filler and sulfur.

32. The herein-described vulcanized composition of matter, comprising linseed oil which has been oxidized at a temperature of 200–250° C., and aluminium salt of a higher fatty acid, an inert filler, and sulfur.

33. The herein-described vulcanized composition of matter, consisting of linseed oil which has been oxidized at a temperature of 200–250° C., aluminium stearate, a mineral hydrocarbon of high boiling point, an inert filler, and sulfur.

In testimony whereof I have hereunto set my hand in presence of two subscribing witnesses.

EDUARD SALOMON ALI COHEN.

Witnesses:
THOMAS H. VERHOOL,
NICOLAAS J. C. HAEDEMAN.